(12) United States Patent
Wiener et al.

(10) Patent No.: US 6,978,017 B2
(45) Date of Patent: Dec. 20, 2005

(54) METHOD AND SYSTEM FOR PROVIDING UPDATED ENCRYPTION KEY PAIRS AND DIGITAL SIGNATURE KEY PAIRS IN A PUBLIC KEY SYSTEM

(75) Inventors: Michael J. Wiener, Nepean (CA); Josanne M. Otway, Ottawa (CA)

(73) Assignee: Entrust Limited, Ottawa (CA)

( * ) Notice: Subject to any disclaimer, the term of this patent is extended or adjusted under 35 U.S.C. 154(b) by 0 days.

(21) Appl. No.: 08/949,525

(22) Filed: Oct. 14, 1997

(65) Prior Publication Data

US 2003/0110376 A1   Jun. 12, 2003

(51) Int. Cl.[7] .............................. H04K 1/00; H04L 9/00
(52) U.S. Cl. ..................... 380/30; 713/176; 380/278
(58) Field of Search ........................... 380/30, 277, 278; 713/176

(56) References Cited

U.S. PATENT DOCUMENTS

| | | | |
|---|---|---|---|
| 5,457,746 A | * | 10/1995 | Dolphin ........................ 380/4 |
| 5,657,390 A | * | 8/1997 | Elgamal et al. ................ 380/49 |
| 5,675,649 A | * | 10/1997 | Brennan et al. ............. 380/286 |
| 5,761,306 A | * | 6/1998 | Lewis ........................ 380/21 |
| 5,787,172 A | * | 7/1998 | Arnold ........................ 380/30 |
| 5,901,227 A | * | 5/1999 | Perlman ....................... 380/21 |
| 5,903,882 A | * | 5/1999 | Asay et al. .................... 705/44 |
| 6,003,014 A | * | 12/1999 | Lee et al. ...................... 705/13 |

OTHER PUBLICATIONS

Ellison, Carl, Generalized Certificates, Feb. 29, 1996.*
RFC 2137 "Secure Domain Name System Dynamic Update", Apr. 1997, pp. 1-10.*
McDonald, Daniel L. et al, "A Socket-Based Key Management API (and Surrounding Infrastructure)", Jun. 24-28, 1996, pp. 1-7.*
Schneier, Bruce "Applied Cryptography", 1996, pp. 44-46.*

* cited by examiner

*Primary Examiner*—Matthew Smithers
*Assistant Examiner*—Michael Pyzocha
(74) *Attorney, Agent, or Firm*—Vedder, Price, Kaufman & Kammholz, P.C.

(57) ABSTRACT

An adaptable cryptographic method and system provides updated digital signature key pairs in a public key system by providing, through a multi-client manager unit, selectable expiry data such as digital signature certificate lifetime data, public key expiry data and private key expiry data as selectable on a per client basis. The multi-client manager unit stores selected public key expiry data and private key expiry data for association with a new digital signature key pair and associates the stored selected expiry data with the new digital signature key pair to facilitate a transition from an old digital signature key pair to a new digital signature key pair.

25 Claims, 4 Drawing Sheets

DIGITAL SIGNATURE KEY PAIR UPDATING

ENCRYPTION KEY PAIR UPDATING

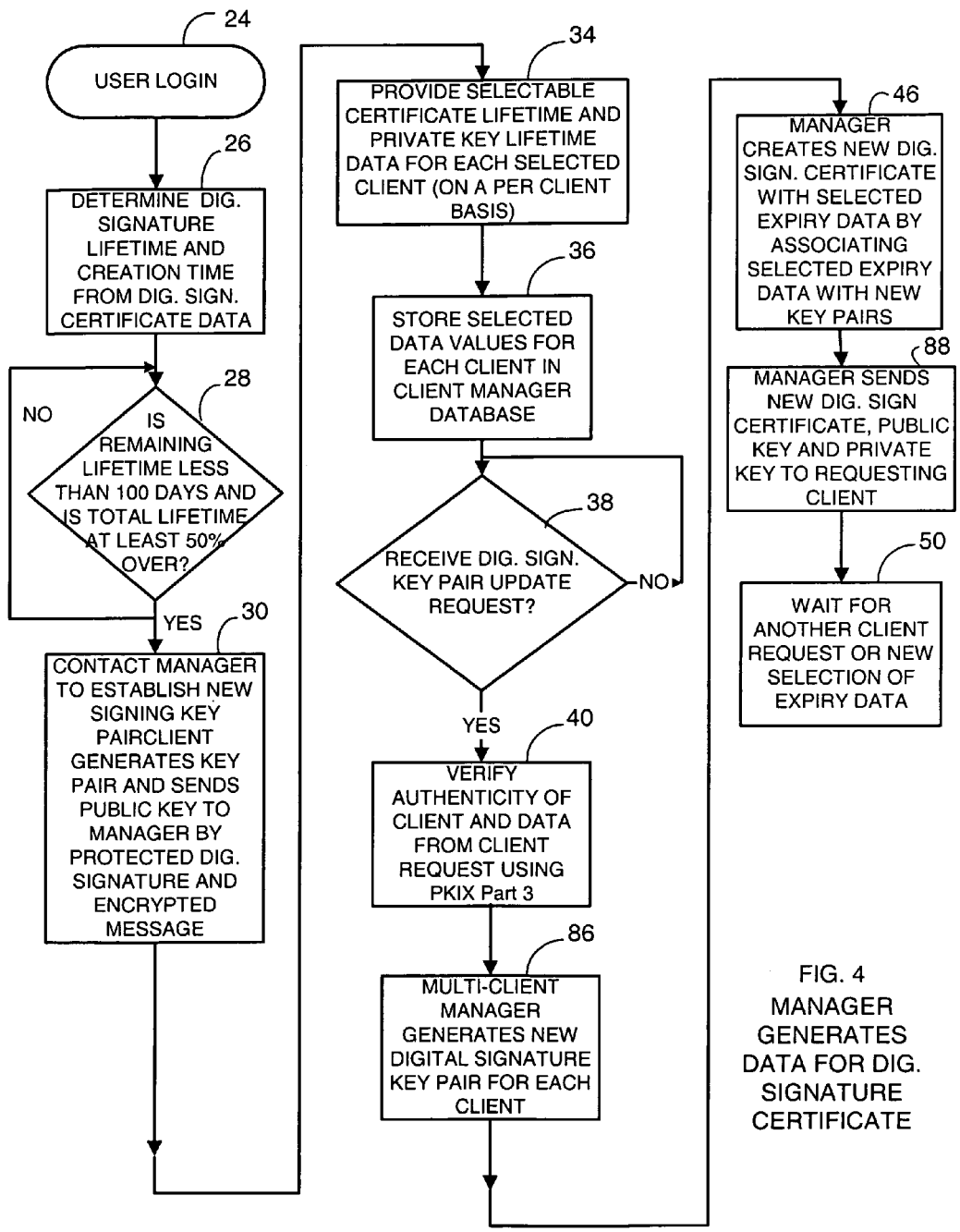

METHOD AND SYSTEM FOR PROVIDING UPDATED ENCRYPTION KEY PAIRS AND DIGITAL SIGNATURE KEY PAIRS IN A PUBLIC KEY SYSTEM

BACKGROUND OF THE INVENTION

The invention relates generally to methods and systems for providing updated public key pairs in a cryptographic system and more specifically to methods and systems for providing updated digital signature key pairs and updated encryption key pairs in public key systems.

In typical public key cryptographic systems, digital signature key pairs (a private key and a public key) are used to authenticate a digital signature of a client to ensure that a message sent by client actually came from the client sending the message. In addition to digital signature key pairs, encryption key pairs are also generally used to encrypt the data being sent from one client to another client. Certificates are generated by a manager or trusted certification authority for the public keys of the private/public key pair to certify that the keys are authentic and valid. The public keys and certificates are used for two main purposes: verifying digital signatures and encrypting information. The receiver of a digitally signed e-mail or documents for example, uses the public key in the sender's certificate to verify the digital signature of the sender. A user wishing to send encrypted e-mail first encrypts the e-mail with a random symmetric key, then uses the intended receiver's public key to encrypt the symmetric key and then attaches the encrypted symmetric key to the encrypted e-mail so that the receiver can decrypt the e-mail.

Hence, a client unit sending a message sends the data with its digital signature along with a certificate. The certificate has the certification authority signature. A receiver validates the digital signature by looking at the received certificate. Each client stores a certification authority public key to verify that the certificate was made by the manager. A digital signature certificate typically includes a user public key, a user name and a signature of the certification authority. Each sender has a copy of its own certificate. To send an encrypted message, a sender accesses a directory, such as an onboard client cache memory or other certificate storage medium to get a copy of the encryption certificate for a specified receiver (other client). For an encrypted message to be considered valid, the digital signature must be valid and there can be no certificate replication by the certification authority. The use of hybrid encryption formats can be used to encrypt a digital signature key for encrypted message transmission. Typically, secure key pair update analysis and requests only occurs when a user is logged onto the system so if a user does not log on for some period of time, an update may not timely occur. For tracking private key expiration, a manager typically sends a validity period of a private key on initialization and the client terminal keeps track of the elapsed period. Or alternatively, the private key expiration date is embedded in the public key certificate.

However, a problem arises because the encryption certificate and digital signature certificates have limited validity periods. If the key pair expires prior to being updated, information can be lost or no longer accessible. Also, it is desirable to have a smooth transition from old to new encryption key pairs during the updating process so changes do not cause unnecessary loss of access to information. Although in conventional public key systems a client is supposed to request an encryption key pair update from a manager in advance of the key expiry period, conventional public key cryptographic systems typically have a fixed default period that is the same for all clients on the system. The fixed default period is generally a fixed percentage of a total key lifetime that is not adjustable by a manager or certification authority. Key lifetime refers to how long a key is valid. If certain clients in the system are required to have only short key lifetime periods, such as temporary contract employees that are required to use the system for only a few days or a few months, the fixed default key expiry period does not typically allow enough time for the system to update key pairs.

It is also important that the system allow certificate validation after a certificate expires, particularly if e-mails are stored or other messages are stored that need to be retrieved after an expiry date has occurred. Typically old messages stay encrypted and signed using the original encryption key and signature keys. The system revalidates the messages each time the data is looked at. Therefore, it is desirable to allow the public key to last longer than the private key expiration to be able to retrieve old messages sent with the old private key. However, with variable term contract employees or other users that only require variable term access clients in the system, it is desirable to stop public key and private key expirations on the same date. With conventional systems that have pre-fixed default settings for all clients, such situations are not adequately accommodated. Traditional systems do not generally allow the flexibility to vary expiration periods on a per user basis.

Consequently there exists a need for a method and system for providing updated digital signature key pairs and encryption key pairs in a public key system that is effectively transparent to a user and that allows for selectable variation of expiry periods on a per user basis.

BRIEF DESCRIPTION OF THE DRAWINGS

The features of the present invention together with the advantages thereof, may be understood by reference to the following description taken in conjunction with the accompanying drawings wherein:

FIG. 4 is a flow diagram generally showing an alternative embodiment where a multi-client manager unit generates new digital signature key pair data for each client.

DETAILED DESCRIPTION OF THE INVENTION

A method and system is disclosed that provides updated digital signature key pairs in a public key system by providing, through a multi-client manager unit, selectable expiry data such as digital signature certificate lifetime data, public key expiry data and private key expiry data as selectable on a per client basis. The multi-client manager unit stores selected public key expiry data and private key expiry data for association with a new digital signature key pair and associates the stored selected expiry data with the new digital signature key pair to facilitate a transition from an old digital signature key pair to a new digital signature key pair.

In one embodiment, the system determines a digital signature private key lifetime end date and a digital signature certificate creation date upon a user login to the public key system. The client initiates a digital signature key pair update request or encryption key pair update request based on at least two criteria both of which must be met. The requests are based on whether a difference between a current date and the digital signature private key lifetime end date (t1) or encryption private key lifetime date is less than an absolute predetermined period of time (days) and whether the difference between the current date and the digital signature private key lifetime end date (t1) or encryption private key lifetime end date is less than a predetermined percentage, such as 50%, of a total duration of a digital signature private key lifetime or encryption private key lifetime. Among other things, this allows time to effect a key pair update even when key lifetimes are only days or weeks long.

Figure 1:
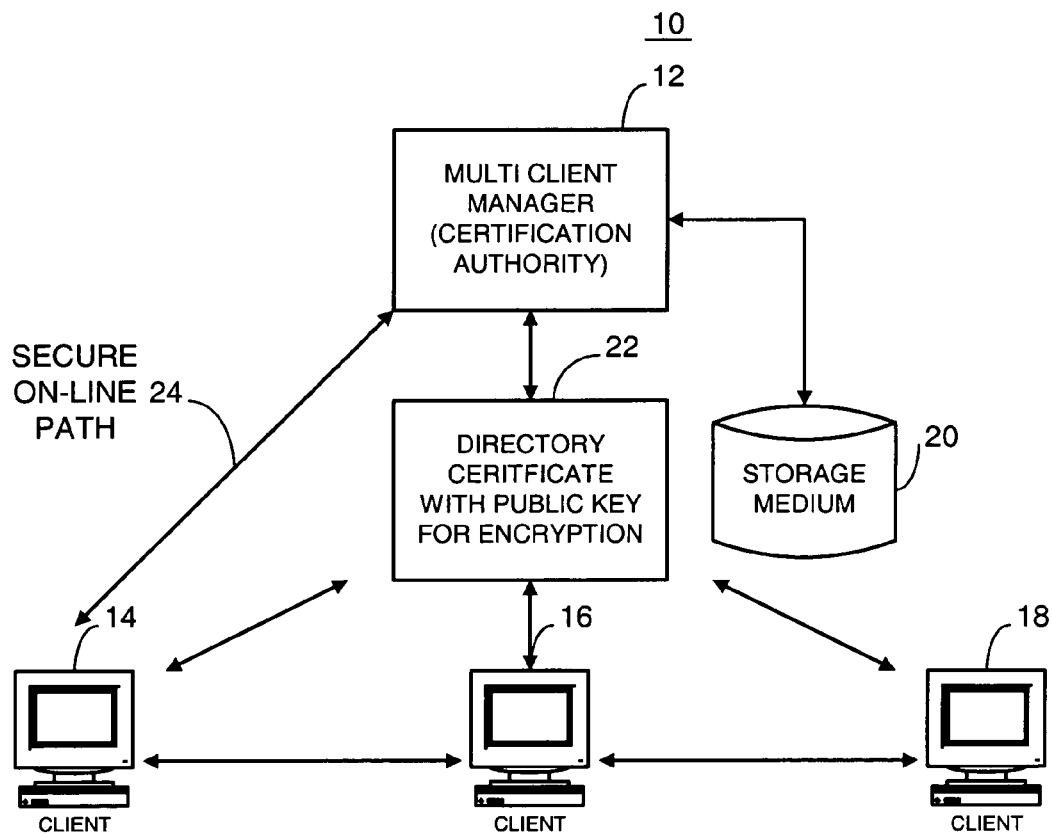
FIG. 1 is a block diagram generally depicting a public key cryptographic system incorporating a method for providing updated digital signature key pairs and encryption key pairs in accordance with one embodiment of the invention.

FIG. 1 shows a public key system 10 having a multi-client manager 12 otherwise known as certification authority that manages a number of clients 14, 16 and 18 in a cryptographic computer network. The multi-client manager 12 accesses a storage medium 20 such as storage disc, ROM or RAM or other suitable storage medium. Each client accesses a directory 22 which may be in a network database or in a local cache memory on each client. The directory 22 contains the certificate with a public key for encryption, otherwise known as an encryption public key certificate.

In operation, the digital signature key pair or signing key pair, is created by the client 14, 16, or 18, when a user first creates a profile. The client securely stores the digital signature private key in a user profile and sends only a verification public key to the multi-client manager 12 in a secure manner, such as over secure online path 24. A digital signature private key is not sent to the multi-client manager and therefore is not backed-up in the certification authority database. When the multi-client manager receives the digital signature public key from a client, 14, 16 or 18, the multi-manager 12 creates a digital signature certificate for the digital signature public key. The digital signature certificate contains a verification public key. A copy of the digital signature certificate is stored in the multi-manager storage medium 20 and a copy of the certificate is returned to the client over secure online path 24.

Unlike the encryption certificate, a copy of the digital signature certificate is not stored in the directory 22. When a user signs a file using the client 14, 16 or 18, the client includes the digital signature certificate with the signed file. Therefore retrieval of the digital signature certificate from the directory is never required.

Figure 2:
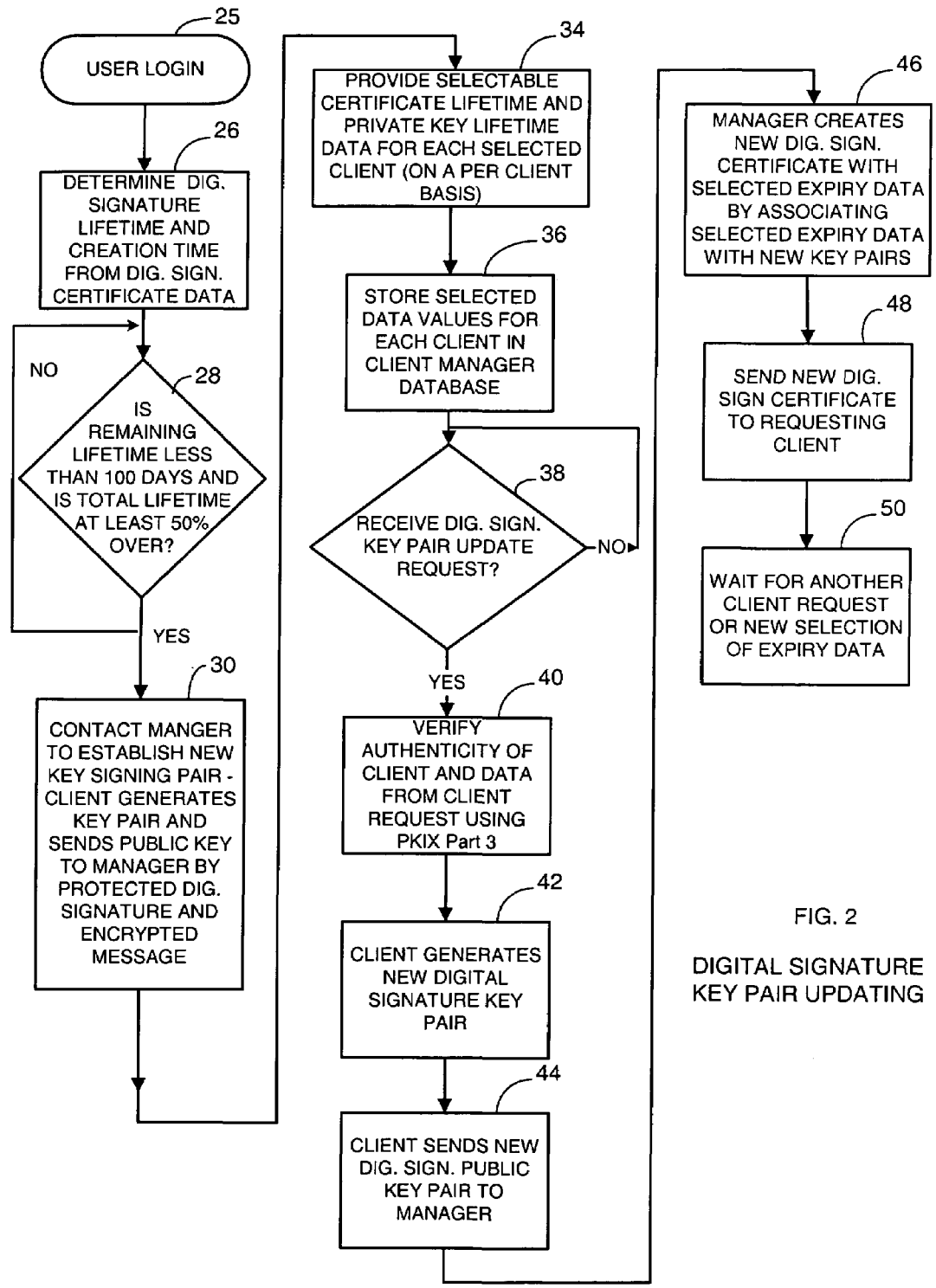
FIG. 2 is a flowchart generally depicting the operation of the system of FIG. 1 for updating digital signature key pairs.

FIG. 2 illustrates a method for providing updated digital signature key pairs in a public key system the system of FIG. 1. In operation, a user logs into a client as indicated in block 25. The client determines a digital signature private key lifetime end date and a digital signature certificate creation date upon the user login by analyzing expiry data in its own digital signature certificate. The digital signature certificate includes data representing the creation date of the certificate, the expiration of the digital signature private key and the expiration of the certificate (which is the expiration of the public key), as indicated in block 26. Generally, all keys have a specific lifetime except a decryption private key that never expires.

By comparing the date information in the certificate, the client determines whether a difference between a current date and the digital signature private key lifetime end date is less than an absolute predetermined period of time, such as whether the remaining lifetime is one hundred days. If this condition is true, the client next determines whether the difference between the current date and the digital signature private key lifetime end date is less than a manager selectable predetermined percentage of total duration of a digital signature private key lifetime. This is shown in block 28. As shown in block 30, the client generates a digital signature key pair, initiates the digital signature key update request and sends the digital signature public key to the manager on the secure online path 24. The request and public key pair is encrypted using the old digital signature private key so the manager can verify the digital signature.

The multi-client manager 12 provides selectable expiry data such as public key expiry data and selectable private key expiry data that is selectable on a per client basis as shown in block 34. A graphic user interface on the multi-client manager unit is used to facilitate setting of the selectable expiry data to a desired state on a per client basis. The selectable expiry data may be digital signature certificate lifetime data for variably setting a lifetime end date for a digital signature certificate associated with a given client. The selectable expiry data may also include public encryption key expiry data or other suitable expiry data.

Using the user interface, a security officer or other authorized user of the multi-client manager unit 12, selects a certificate lifetime and private key lifetime for each selected client on a per client basis so that the cryptographic system 10 can adapt to changes to any client in the system. For example in the case of a contractor or temporary employee, the manager unit 12 provides a security officer with the ability to select a certificate lifetime and private key lifetime as desired. Once selected, the manager unit 12 stores the selected data values for each client in the client manager storage medium 20 in a database, as indicated in block 36. The selected data values should preferably facilitate the initiation of an update if the duration between a current date and an expiry date is less than one hundred days or if the duration of the current date to the expiry date is less than one-half of the total key lifetime.

As shown in block 38, the multi-client manager unit 12 determines whether a digital signature key pair update request has been received from a client unit 14, 16 or 18. If no digital signature key pair update request has been received from the client unit, the multi-client manager unit continues its normal operation and waits to receive such a request. If a client has sent a digital signature key pair update request, the multi-client manager unit 12 verifies the authenticity of the client based on the digital signature certificate and data from the client as shown in block 40. The protocol for this communication may be any suitable protocol, but is preferably a PKIX part 3 type protocol standard produced by the Internet Engineering Task Force (IETF). The client sending the digital signature key pair update request also generates the new digital signature key pair as shown in block 42. The client sends the new digital signature key pair to the manager unit 12 as indicated in block 44. The manager unit 12 receives the new digital signature key pair from the client in response to the digital signature key pair update request.

After the manager 12 has received the new digital signature key pair from the client unit, the manager 12 creates a new digital signature certificate containing the selected public key expiry data as entered by the security officer, for the client generating the digital signature key pair update request. The manager 12 associates the selected expiry data with the new key pairs as indicated by linking the selected expiry data with the public digital signature key as shown in block 46. The manager sends the new digital signature certificate to the requesting client on the secure online path 24 as indicated in block 48. The manager then waits for another client request or new selection of expiry data for another client as indicated in block 50. By associating the stored selected expiry data with the new digital signature key pair, the manager unit controls the transition for updating an old signature key pair to a new digital signature key pair. Also, by providing variable expiry periods on a per client basis, the manager maintains oversight of the key pair updating and allows adaptive usage of clients by many users so that short expiry periods are readily accommodated.

The multi-client manager 12 is preferably a UNIX based workstation computer or server or any other suitable computer. The manager unit preferably performs the above identified steps under software control so that the programmed manager computing unit serves as the device for providing the selectable expiry data and associating the selected expiry data with the new respective key pairs. The storage medium 20, may contain the software program for instructing the manager to carry out the above identified steps.

The manager 12 also provides variable update privilege control on a per client basis to facilitate denial of updating the digital signature key pair on a per client basis. This may be useful in a situation where a temporary employee attempts to use the system after termination or after the expiry period. It will be recognized that the user interface may be any suitable user interface such as a Windows based interface which presents a security officer with the option of setting expiry dates on a per client basis.

Figure 3:
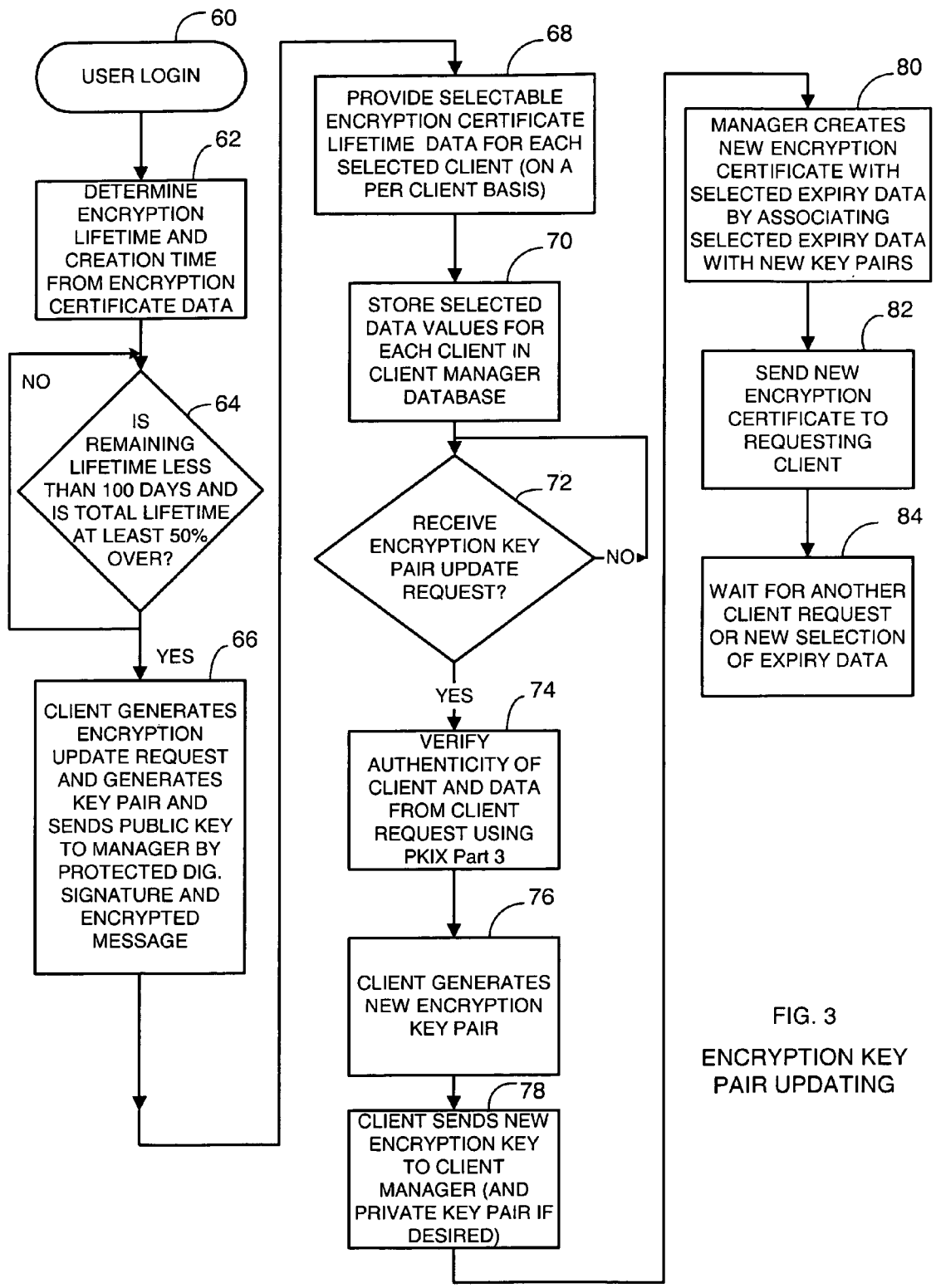
FIG. 3 is a flow diagram generally depicting the operation of the system of FIG. 1 updating an encryption key pair in accordance with one embodiment of the invention.

FIG. 3 shows the operation of the system 10 providing updated encryption key pairs in a public key system. The method is substantially similar to that of FIG. 2 except instead of digital signature key pairs, encryption key pairs are updated. Upon user login, the client determines the encryption key lifetime and creation time from the encryption certificate data in the directory as indicated in blocks 60 and 62. As shown in block 64, the client determines if the remaining key lifetime duration of the public encryption key is less than one hundred days and, if so, the client next determines whether the difference between the current date and the encryption private key lifetime end date is less than a manager selectable predetermined percentage, such as 50%, of total duration of a encryption private key lifetime. If these two conditions are met, the client initiates the encryption key pair update request to contact the manager to establish a new key pair and generates an encryption key pair and sends the public encryption key to the manager by the protected digital signature and encrypted message on secure path 24 as shown in block 66.

As described with respect to FIG. 2, the program stored on storage medium 20 for the multi-client manager 12 also provides selectable encryption certificate lifetime data for each client on a per client basis as indicated in block 68. The selectable encryption certificate lifetime data is selectable expiry data which includes public key expiry data and selectable private key expiry data. As shown in block 70, the multi-client manager 12 stores the selected public encryption key expiry data and selectable private encryption key expiry data for association with a new encryption key pair. The selected public key expiry and selectable private key data is selectable through the user interface by a security officer to define exact expiry data on a per client basis so that different expiry periods can be assigned through the manager to different clients. The multi-client manager unit 12 waits to receive an encryption key pair update request as shown in block 72. When an encryption key pair update request has been received from a client, the manager 12 verifies the authenticity of a client and data sent therewith using PKIX part 3 protocol as previously described. This is shown in block 74. The client generates the new encryption key pair as indicated in block 76 and sends the new public encryption key to the manager 12 as shown in block 78.

The selectable expiry data is encryption certificate lifetime data. The multi-client manager 12 allows the encryption certificate lifetime data to be set at a number of days or other period for any given client to variably set a lifetime end date for an encryption certificate associated with a given client.

As shown in block 80, the manager 12 creates a new encryption certificate with the selected expiry data, by associating the selected expiry data with the new key pair to facilitate a transition from an old signature key pair to a new digital key pair. The manager sends the new encryption certificate to the requesting client for storage in the client directory 22 as indicated in block 82. The manager then waits for another client request or new selection of expiry data by a security officer as indicated in block 84.

FIG. 4 illustrates an alternative embodiment where the manager generates the new digital signature key pair for each client in response to receiving the client digital signature key pair update request. The steps are the same as those previously described with respect to FIG. 2, however upon verification of authenticity of the client requesting a new digital signature key pair, the multi-client manager generates the new signature key pair for a given client as indicated in block 86. In addition, after associating the previously selected expiry data with the new key pairs, the manager sends a new digital signature certificate public and private key to the requesting client as indicated in block 88.

In yet another embodiment, the system 10 may have a manager 12 wherein the manager creates and sends a signed message to a selected client's directory entry indicating that the client needs to update an encryption key pair or update a signature key pair upon determination of an expiry condition. For example, the manager stores a certificate expiration message in a client directory entry upon determination by the multi-client manager unit 12 of a digital signature key expiry condition. This helps facilitate a digital signature key pair update request or encryption key pair update request by a client so that the client need not continually determine an expiry period upon every login but instead analyzes an encryption certificate or other data in the directory to determine whether to send a key update request.

It should be understood that the implementation of other variations and modifications of the invention in its various aspects will be apparent to those of ordinary skill in the art, and that the invention is not limited by the specific embodiments described. It is therefore contemplated to cover by the present invention, any and all modifications, variations, or equivalents that fall within the spirit and scope of the basic underlying principles disclosed and claimed herein.

What is claimed is:

1. A method for providing updated digital signature key pairs to a plurality of clients in a public key system comprising the steps of:

providing, by a multi-client management unit and not by a client, selectable digital signature expiry data including at least public verification key expiry data, and selectable private signing key expiry data to a plurality of clients, that are selectable on a per client basis wherein the digital signature key pairs are not shared among users;

digitally storing both selected public key expiry data and selected private key expiry data for association with a new digital signature key pair; and associating the stored selected expiry data with a new digital signature key pair to effect a transition from an old digital signature key pair to a new digital signature key pair;

determining whether a digital signature key pair update request has been received from a client unit;

receiving a new digital signature key pair from the client unit in response to the digital signature key pair update request; and wherein the step of associating the stored selected expiry data includes creating a new digital signature certificate containing the selected public key expiry data selected for the client that generated the digital signature key pair update request.

2. The method of claim 1 wherein the selectable expiry data is digital signature certificate lifetime data for variably setting a lifetime end date for a digital signature certificate.

3. The method of claim 1 further including the step of providing variable update privilege control on a per client basis to the multi-client manager unit to facilitate denial of updating the digital signature key pair on a per client basis.

4. The method of claim 1 further comprising the steps of:
determining a digital signature private key lifetime end date and a digital signature certificate creation date upon a user login to the public key system;
initiating, by a client unit, a digital signature key pair update request based on whether a difference between a current date and the digital signature private key lifetime end date (t1) is less than an absolute predetermined period of time and based on whether the difference between the current date and the digital signature private key lifetime end date (t1) is less than a selectable predetermined percentage of a total duration of a digital signature private key lifetime.

5. The method of claim 1 wherein the step of providing selectable expiry data on a per client basis includes providing a user interface to facilitate setting of the selectable expiry data to a desired state.

6. The method of claim 1 including generating, by the multi-client manager unit, the new digital signature key pair for a client in response to the multi-client manager unit receiving a digital signature key pair update request.

7. The method of claim 1 including storing a certificate expiration message in a client directory entry upon determination by the multi-client manager unit of a digital signature key expiry condition to facilitate a digital signature key pair update request by a client.

8. A method for providing updated encryption key pairs in a public key system comprising the steps of:
providing, through a multi-client manager unit, selectable expiry data including public encryption key expiry data associated with a public encryption key that is selectable on a per client basis, and providing updated digital signature key pairs;
digitally storing selected public encryption key expiry data for association with a new encryption key pair and storing a new digital signature key pair;
generating a new encryption key pair that is not computable from a previous encryption key pair; and
associating the stored selected expiry data with the new encryption key pair to affect a transition from an old encryption key pair to a new encryption key pair and associating stored selected expiry data selected for the new digital signature key pair to affect a transition from an old digital signature key pair to a new digital signature key pair, wherein the selectable expiry data is digital signature certificate lifetime data for variably setting a lifetime end date for a digital signature certificate and also includes encryption certificate lifetime data for variably setting a lifetime end date for an encryption certificate associated with the given client.

9. The method of claim 8 further including the step of providing variable update privilege control on a per client basis to the multi-client manager unit to facilitate denial of updating the digital signature key pair and the encryption key pair.

10. The method of claim 8 wherein the digital signature certificate includes selectable private key lifetime end data.

11. A system for providing updated digital signature key pairs to a plurality of clients in a public key system comprising:
multi-client management means for providing selectable digital signature expiry data to a plurality of clients and not by a client, including at least both public verification key expiry data and private signing key expiry data that are selectable on a per client basis wherein the digital signature key pairs are not shared among users;
means, accessible by the multi-client manager means, for digitally storing both selected public key expiry data and selected private key expiry data for association with a new digital signature key pair;
means, responsive to the stored selected public key expiry data, for associating the stored selected expiry data with the new digital signature key pair to affect a transition from an old digital signature key pair to a new digital signature key pair;
means for determining whether a digital signature key pair update request has been received from a client unit;
means for receiving a new digital signature key pair from the client unit in response to the digital signature key pair update request; and
wherein the means for associating the stored selected expiry data creates a new digital signature certificate containing the selected public key expiry data selected for the client that generated the digital signature key pair update request.

12. The system of claim 11 wherein the selectable expiry data is digital signature certificate lifetime data for variably setting a lifetime end date for a digital signature certificate.

13. The system of claim 11 further including means for providing variable update privilege control on a per client basis to the multi-client manager means to facilitate denial of updating the digital signature key pair on a per client basis.

14. The system of claim 13 wherein the multi-client manager means includes the means for associating the stored selected expiry data with the new digital signature key pair and includes the means for providing variable update privilege control.

15. The system of claim 11 further comprising:
means for determining a digital signature private key lifetime end date and a digital signature certificate creation date upon a user login to the public key system;
client means for initiating a digital signature key pair update request based on whether a difference between a current date and the digital signature private key lifetime end date (t1) is less than an absolute predetermined period of time and based on whether the difference between the current date and the digital signature private key lifetime end date (t1) is less than a selectable predetermined percentage of a total duration of a digital signature private key lifetime.

16. The system of claim 11 wherein the means for providing selectable expiry data on a per client basis provides a user interface to facilitate setting of the selectable expiry data to a desired state.

17. A storage medium comprising:
a stored program for execution by a processor wherein the program facilitates providing updated digital signature key pairs in a public key system by:
allowing entry of selectable expiry data for a plurality of clients and not through a client, including both at least public verification key expiry data and signing private key expiry data that are selectable on a per client basis wherein the digital signature key pairs are not shared among users;
digitally storing both selected public key expiry data and selected private key expiry data for association with a new digital signature key pair;
associating the stored selected expiry data with the new digital signature key pair to affect a transition from an old digital signature key pair to a new digital signature key pair;
determining whether a digital signature key pair update request has been received from a client unit;
receiving a new digital signature key pair from the client unit in response to the digital signature key pair update request; and
creating a new digital signature certificate containing the selected public key expiry data selected for the client that generated the digital signature key pair update request.

18. The storage medium of claim 17 wherein the stored program allows selection of digital signature certificate lifetime data for variably setting a lifetime end date for a digital signature certificate.

19. The storage medium of claim 17 wherein the stored program further includes affecting variable update privilege control on a per client basis by a multi-client manager unit to provide denial of updating the digital signature key pair on a per client basis.

20. The storage medium of claim 17 wherein the stored program further facilitates the steps of:
determining a digital signature private key lifetime end date and a digital signature certificate creation date upon a user login to the public key system;
initiating, by a client unit, a digital signature key pair update request based on whether a difference between a current date and the digital signature private key lifetime end date (t1) is less than an absolute predetermined period of time and based on whether the difference between the current date and the digital signature private key lifetime end date (t1) is less than a selectable predetermined percentage of a total duration of a digital signature private key lifetime.

21. The storage medium of claim 17 wherein the stored program provides a user interface to facilitate setting of the selectable expiry data to a desired state.

22. The method of claim 4 wherein the selectable predetermined percentage of a total duration of a digital signature private key lifetime includes a selectable period of time.

23. The system of claim 15 wherein the selectable predetermined percentage of a total duration of a digital signature private key lifetime includes a selectable period of time.

24. The storage medium of claim 20 wherein the selectable predetermined percentage of a total duration of a digital signature private key lifetime includes a selectable period of time.

25. A method for providing updated digital signature key pairs to a plurality of clients in a public key system comprising the steps of:
providing, by a multi-client manager unit and not by a client, selectable digital signature expiry data including at least public verification key expiry data, and selectable private signing key expiry data to a plurality of clients, that are selectable on a per client basis wherein the digital signature key pairs are not shared among users;
digitally storing both selected public key expiry data and selected private key expiry data for association with a new digital signature key pair;
determining whether a digital signature key pair update request has been received from a client unit;
receiving a new digital signature key pair from the client unit in response to the digital signature key pair update request;
associating the stored selected expiry data with the new digital signature key pair to affect a transition from an old digital signature key pair to a new digital signature key pair; and
wherein the step of associating the stored selected expiry data includes creating a new digital signature certificate containing the selected public key expiry data selected for the client generating the digital signature key pair update request, a user public key, a user name and a signature of the multi-client manager unit.

* * * * *